US012736761B2

(12) United States Patent
Huang

(10) Patent No.: US 12,736,761 B2

(45) Date of Patent: Sep. 15, 2026

(54) 800G OPTICAL MODULE WITH SINGLE-MODE BIDIRECTIONAL FIBER

(71) Applicant: SHUNYUN TECHNOLOGY (ZHONGSHAN) Limited, Zhongshan (CN)

(72) Inventor: Jie Huang, Zhongshan (CN)

(73) Assignee: SHUNYUN TECHNOLOGY (ZHONGSHAN) Limited, Zhongshan (CN)

( * ) Notice: Subject to any disclaimer, the term of this patent is extended or adjusted under 35 U.S.C. 154(b) by 324 days.

(21) Appl. No.: 18/437,207

(22) Filed: Feb. 8, 2024

(65) Prior Publication Data

US 2024/0280769 A1 Aug. 22, 2024

(30) Foreign Application Priority Data

Feb. 21, 2023 (CN) ......................... 202310149646.5

(51) Int. Cl.
*G02B 6/42* (2006.01)

(52) U.S. Cl.
CPC ......... *G02B 6/4246* (2013.01); *G02B 6/4286* (2013.01)

(58) Field of Classification Search
CPC ............................ G02B 6/4246; G02B 6/4286
See application file for complete search history.

(56) References Cited

FOREIGN PATENT DOCUMENTS

| CN | 102654608 A | 9/2012 |
|---|---|---|
| CN | 213874893 U | 8/2021 |

OTHER PUBLICATIONS

English translation of CN102654608A (Year: 2012).*
English translation of CN213874893U (Year: 2021).*

* cited by examiner

*Primary Examiner* — Sung H Pak

(57) ABSTRACT

An 800G optical module with single-mode bidirectional fiber includes a housing and a printed circuit board (PCB) substrate, where two lenses are provided on the PCB substrate side by side; a filter and a beam splitter are provided in each of the lenses; a groove is formed at a bottom of the lens; the groove is covered by one light emission assembly and one light reception assembly, which are fixed on the PCB substrate; the lens is connected to a fiber array; two fiber arrays are connected to one optical connector; a connecting fiber between the fiber array and the optical connector is a single-mode bidirectional fiber; light emitted from the light emission assembly is transmitted to the optical connector, the beam splitter, the filter and the fiber array; and light received by the fiber array is transmitted to the light reception assembly.

8 Claims, 7 Drawing Sheets

800G OPTICAL MODULE WITH SINGLE-MODE BIDIRECTIONAL FIBER

CROSS REFERENCE TO RELATED APPLICATIONS

The present application claims the benefit of Chinese Patent Application No. 202310149646.5 filed on Feb. 21, 2023, the contents of which are incorporated herein by reference in their entirety.

TECHNICAL FIELD

The present disclosure relates to the technical field of fiber communications, and in particular to an 800G optical module with single-mode bidirectional fiber.

BACKGROUND

With rapid development of optical communication industry, an optical module as an important device in the optical communication industry is also developed constantly. At present, a high rate is considered as an important development trend for the optical module. The 800G optical module is an optical module with a transmission rate of 800 G. Compared with a 400G optical module, a 200G optical module and the like, the 800G optical module has a higher transmission rate. Correspondingly, a larger number of electronic components and more varieties of the electronic components are used in the 800G optical module. Thus, a higher integration level and a higher layout requirement are imposed on each component in the 800G optical module. Therefore, how to reserve more space to provide components on a printed circuit board (PCB) substrate is a problem to be solved urgently.

SUMMARY

An objective of the present disclosure is to provide an 800G optical module with single-mode bidirectional fiber, to reserve more space to provide components on a PCB substrate.

To achieve the above objective, the present disclosure adopts the following technical solutions:

An 800G optical module with single-mode bidirectional fiber provided by the present disclosure includes a housing and a PCB substrate in the housing, where two lenses are provided on the PCB substrate side by side along a width direction of the PCB substrate; a filter and a beam splitter are provided in each of the lenses; a groove with a downward rabbet is formed at a bottom of the lens; the groove of the lens is covered by one light emission assembly and one light reception assembly; both the light emission assembly and the light reception assembly are fixed on an upper surface of the PCB substrate; an end of the lens is connected to a fiber array; two fiber arrays are connected to one optical connector; a connecting fiber between the fiber array and the optical connector is a single-mode bidirectional fiber; light emitted from the light emission assembly is transmitted to the optical connector through the lens, the beam splitter, the filter and the fiber array; and light received by the fiber array is transmitted to the light reception assembly through the filter and the lens.

Preferably, the upper surface of the lens includes a first horizontal plane, an oblique plane, and a second horizontal plane; a height of the first horizontal plane is less than a height of the second horizontal plane; the oblique plane is connected between the first horizontal plane and the second horizontal plane; the fiber array is connected to an end of the first horizontal plane; the oblique plane is provided above the light reception assembly; and an inclination angle of the oblique plane is 45° less than an inclination angle of the filter.

Preferably, the filter is provided obliquely above the light reception assembly; the beam splitter is provided directly above the light emission assembly; and a reflecting surface of the beam splitter is formed into an included angle of 45° with the light emitted from the light emission assembly.

Preferably, the light reception assembly includes a light receiving chip and a trans-impedance amplifier at a side of the light receiving chip; and the trans-impedance amplifier is fixed on the upper surface of the PCB substrate.

Preferably, the light reception assembly further includes a monitor photo detector (MPD); the MPD is provided at a side of the light emission assembly; and the MPD is configured to receive light split by the beam splitter.

Preferably, four walls of the groove each are provided with a gap; and an end of the trans-impedance amplifier is inserted into the gap of one of the walls.

Preferably, the light emission assembly includes a laser and a light driver; the light driver is provided at a side of the laser; and the light driver is connected to the laser.

Preferably, in one of the two lenses, the filter has a wavelength of 855 nm, the light receiving chip has a wavelength of 908 mm, and an optical wavelength output by the laser is 855 nm; and in the other one of the two lenses, the filter has a wavelength of 908 nm, the light receiving chip has a wavelength of 855 nm, and an optical wavelength output by the laser is 908 nm.

Preferably, a digital signal processor is further provided on the PCB substrate; and the digital signal processor is provided at a side of the lens.

The 800G optical module with single-mode bidirectional fiber provided by the embodiment of the present disclosure has the following beneficial effects over the prior art:

According to the 800G optical module with single-mode bidirectional fiber provided by the embodiment of the present disclosure, the single-mode bidirectional fiber is used to connect the fiber array and the optical connector, such that one fiber can transmit a 100G emitted signal and a 100G received signal, thereby improving a transmission bandwidth. Meanwhile, the filter and the beam splitter are provided in the lens. Light emitted from the light emission assembly is transmitted to the optical connector through the lens, the beam splitter, the filter and the fiber array. Light received by the fiber array is transmitted to the light reception assembly through the filter and the lens. The present disclosure optimizes transmission of an optical path through the lens, the filter and the beam splitter. The lens can be provided with the light emission assembly and the light reception assembly at the same time, so the present disclosure saves space and reserves more space to provide other electronic components on the PCB substrate.

Figure 1:
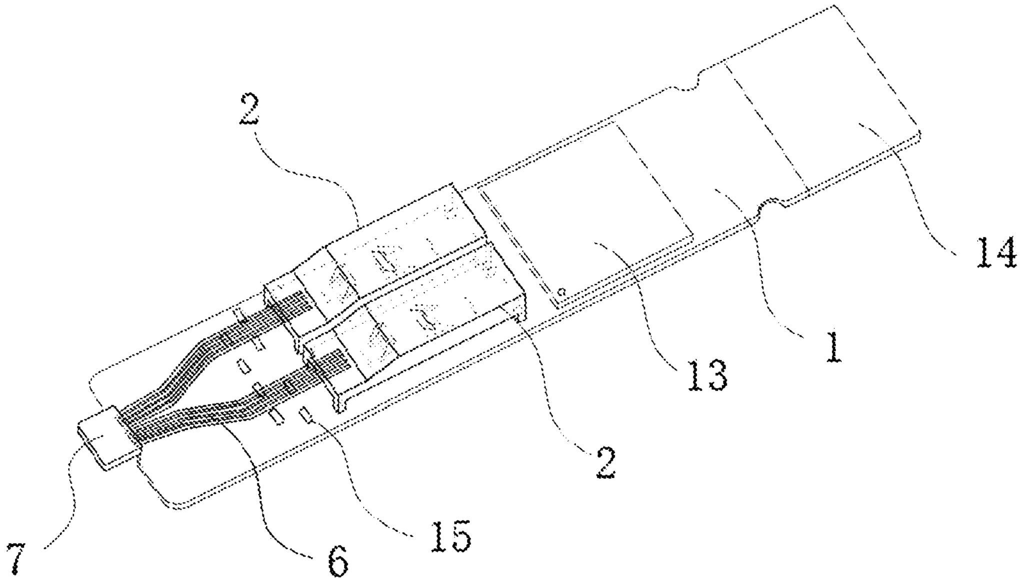
FIG. 1 is a schematic structural view of an 800G optical module with single-mode bidirectional fiber according to an embodiment of the present disclosure.

In the figures: 1: PCB substrate, 2: lens, 201: groove, 202: first horizontal plane, 203: oblique plane, 204: second horizontal plane, 3: filter, 4: beam splitter, 5: fiber array, 6: connecting fiber, 7: optical connector, 8: light receiving chip, 9: trans-impedance amplifier, 10: MPD, 11: laser, 12: light driver, 13: digital signal processor, 14: gold finger electrical connector, 15: electronic element, 16: housing, 20: light emission assembly, and 21: light reception assembly.

DETAILED DESCRIPTION

It should be explained that in the description of the present disclosure, terms such as “central”, “longitudinal”, “transverse” “upper”, “lower”, “front”, “rear”, “left”, “right” “vertical”, “horizontal”, “top”, “bottom”, “inside” and “outside” indicate the orientation or positional relationships based on the drawings. They are merely intended to facilitate and simplify the description of the present disclosure, rather than to indicate or imply that the mentioned device or components must have a specific orientation or must be constructed and operated in a specific orientation. Therefore, these terms should not be construed as a limitation to the present disclosure.

In the description of the present disclosure, it should be noted that, unless otherwise clearly specified, meanings of terms “mount”, “connected with”, and “connected to” should be understood in a board sense. For example, the connection may be a fixed connection, a removable connection, or an integral connection; may be a mechanical connection or an electrical connection; may be a direct connection or an indirect connection by using an intermediate medium; or may be intercommunication between two elements. Those of ordinary skill in the art may understand specific meanings of the foregoing terms in the present disclosure based on a specific situation.

The specific implementations of the present disclosure are described in more detail below with reference to the accompanying drawings and embodiments. The following examples are intended to illustrate the present disclosure, but not to limit the scope of the present disclosure.

As shown in FIG. 1 to FIG. 7, an 800G optical module with single-mode bidirectional fiber provided by the embodiment of the present disclosure includes a housing 16 and a PCB substrate 1 in the housing 16. Two lenses 2 are provided on the PCB substrate 1 side by side along a width direction of the PCB substrate 1. A length direction of each of the lenses 2 is the same as a length direction of the PCB substrate 1. A filter 3 and a beam splitter 4 are provided in the lens 2. A groove 201 with a downward rabbet is formed at a bottom of the lens 2. The groove 201 of the lens 2 is covered by one light emission assembly 20 and one light reception assembly 21. Both the light emission assembly 20 and the light reception assembly 21 are fixed on an upper surface of the PCB substrate 1. The light emission assembly 20 and the light reception assembly 21 are accommodated in a space between the groove 201 and the PCB substrate 1. An end of the lens 2 is connected to a fiber array 5. Two fiber arrays 5 are connected to one optical connector 7. A connecting fiber 6 between the fiber array 5 and the optical connector 7 is a single-mode bidirectional fiber. Light emitted from the light emission assembly 20 is transmitted to the optical connector 7 through the lens 2, the beam splitter 4, the filter 3 and the fiber array 5. Light received by the fiber array 5 is transmitted to the light reception assembly 21 through the filter 3 and the lens 2.

The single-mode bidirectional fiber is used to connect the fiber array 5 and the optical connector 7, such that one fiber can transmit a 100G emitted signal and a 100G received signal, thereby improving a transmission bandwidth. Meanwhile, the filter 3 and the beam splitter 4 are provided in the lens 2. Light emitted from the light emission assembly 20 is transmitted to the optical connector 7 through the lens 2, the beam splitter 4, the filter 3 and the fiber array 5. Light received by the fiber array 5 is transmitted to the light reception assembly 21 through the filter 3 and the lens 2. The present disclosure optimizes transmission of an optical path through the lens 2, the filter 3 and the beam splitter 4. The lens 2 can be provided with the light emission assembly 20 and the light reception assembly 21 at the same time, so the present disclosure saves space and reserves more space to provide other electronic components on the PCB substrate 1. In the embodiment, the lens 2 is provided with four channels for transmitting a signal. In combination with the single-mode bidirectional fiber, the transmission rate can be up to 800 G. While the transmission bandwidth is improved, the fiber material and the internal space can be saved.

Figure 6:
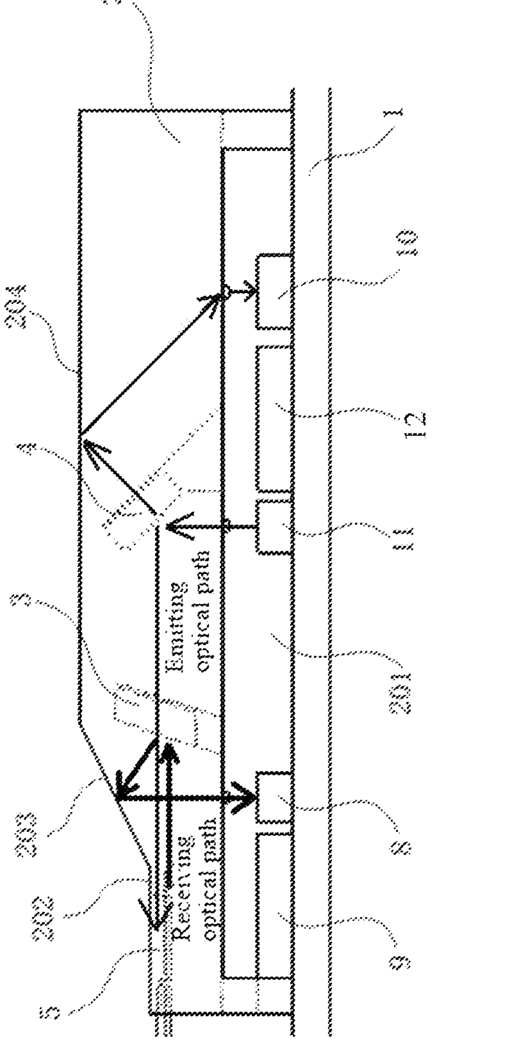
FIG. 6 is a schematic view illustrating an optical transmission path in a lens according to an embodiment of the present disclosure.
Figure 7:
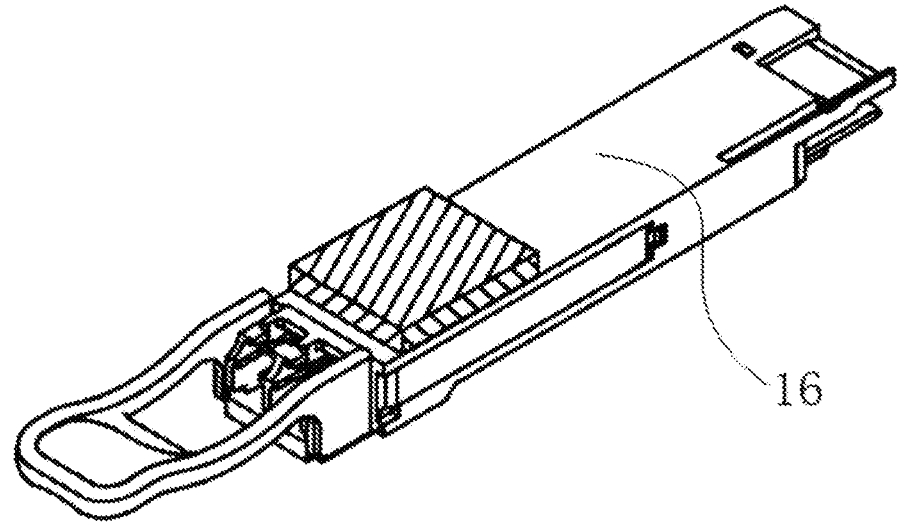
FIG. 7 is a schematic structural view of a housing according to an embodiment of the present disclosure.

In the embodiment, as shown in FIG. 6, the upper surface of the lens 2 includes a first horizontal plane 202, an oblique plane 203, and a second horizontal plane 204. A height of the first horizontal plane 202 is less than a height of the second horizontal plane 204. The oblique plane 203 is connected between the first horizontal plane 202 and the second horizontal plane 204. The fiber array 5 is connected to an end of the first horizontal plane 202. The oblique plane 203 is provided above the light reception assembly 21. An inclination angle of the oblique plane 203 relative to the first horizontal plane 202 is 45° less than an inclination angle of the filter 3 relative to the first horizontal plane 202. The lens 2 is provided as the first horizontal plane 202, the oblique plane 203, and the second horizontal plane 204. The fiber array 5 is connected to an end of the first horizontal plane 202. The fiber array 5 transmits light horizontally. By providing a difference between the inclination angle of the oblique plane 203 and the inclination angle of the filter 3 at 45°, light transmitted back from the fiber array 5 is reflected by the filter 3 and the oblique plane 203. Consequently, the light enters the light reception assembly 21 along a vertical direction. This further optimizes a transmission path of the light.

Figure 2:
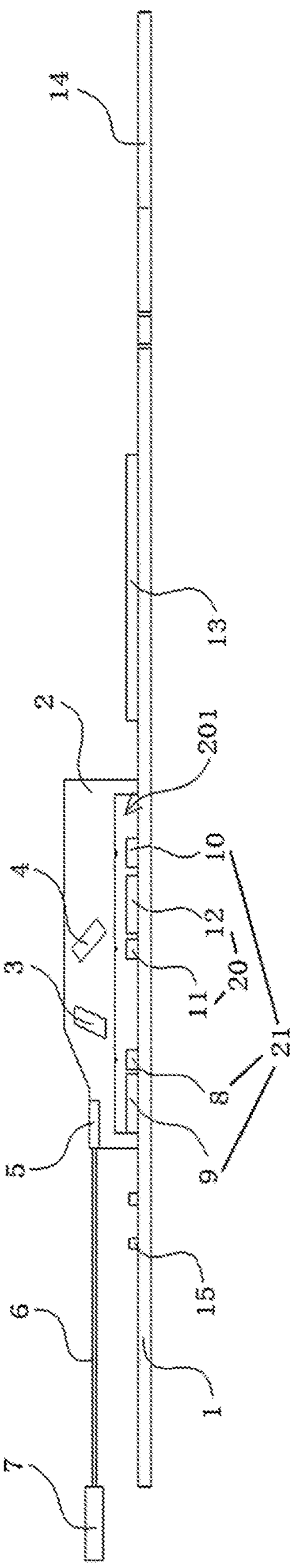
FIG. 2 is a schematic front view of an 800G optical module with single-mode bidirectional fiber according to an embodiment of the present disclosure.
Figure 3:
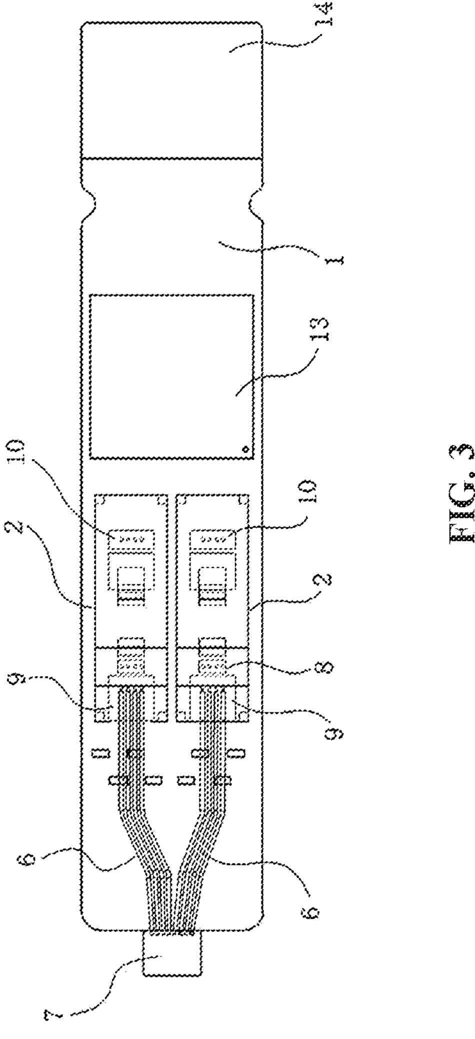
FIG. 3 is a schematic top view of an 800G optical module with single-mode bidirectional fiber according to an embodiment of the present disclosure.
Figure 4:
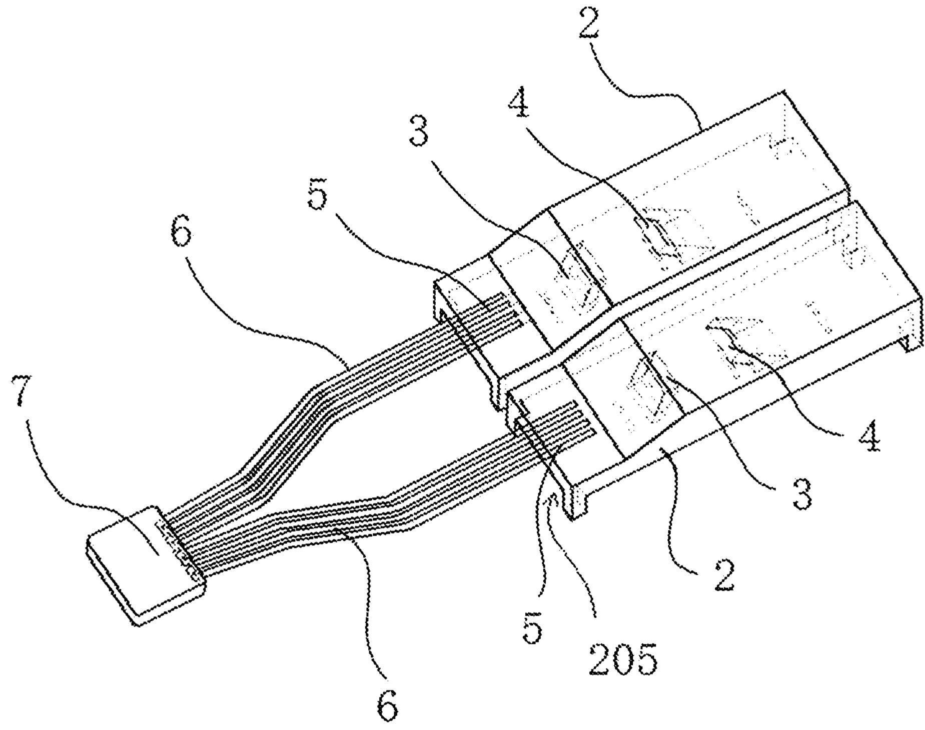
FIG. 4 is a schematic view illustrating a connection between a lens and an optical connector according to an embodiment of the present disclosure.
Figure 5:
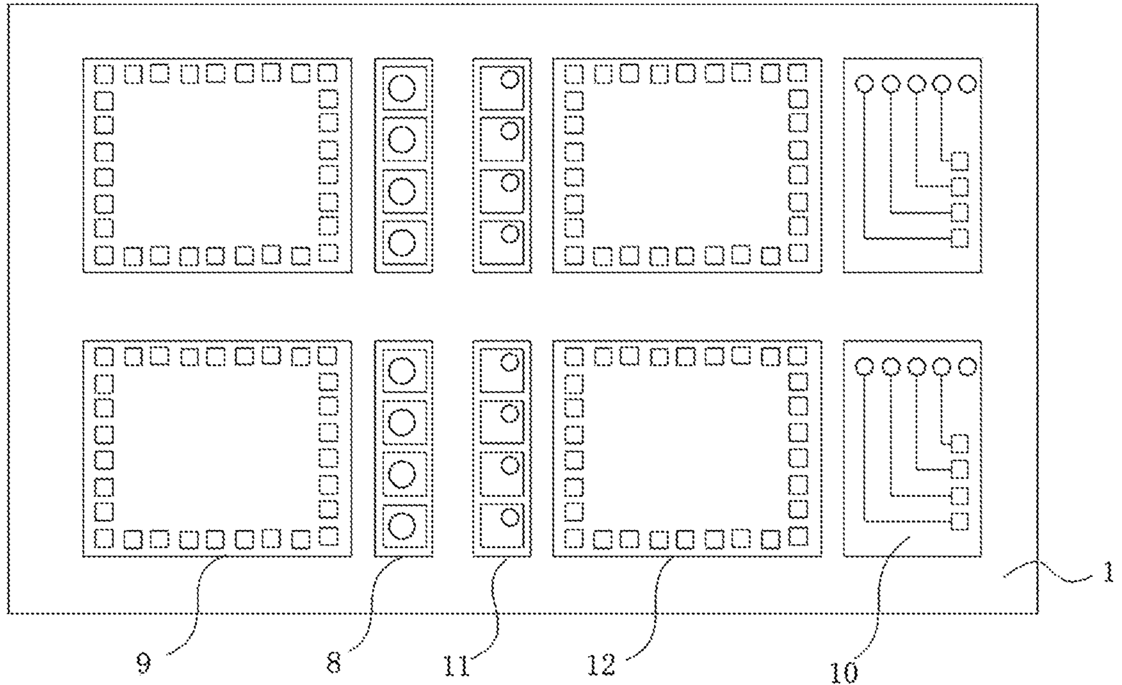
FIG. 5 is a schematic view illustrating a layout of a light emission assembly and a light reception assembly on a PCB substrate according to an embodiment of the present disclosure.

In the embodiment, as shown in FIG. 2 and FIG. 4, the filter 3 is provided obliquely above the light reception assembly 21. The beam splitter 4 is provided directly above the light emission assembly 20. The term “obliquely above” refers to that the filter 3 is located at an upside of a horizontal plane of the light reception assembly 21, and projection of the filter 3 on the horizontal plane does not coincide with projection of the light reception assembly 21 on the horizontal plane. The term “directly above” refers to that the beam splitter 4 is located at an upside of a horizontal plane of the light emission assembly 20, and projection of the light splitter 4 on the horizontal plane coincides with projection of the light emission assembly 20 on the horizontal plane. A reflecting surface of the beam splitter 4 is formed into an included angle of 45° with the light emitted from the light emission assembly 20. The light emitted from the light emission assembly 20 is along the vertical direction. After reflected by the reflecting surface of the beam splitter 4, the light enters the filter 3 and the fiber array 5 along a horizontal direction. This adjusts the transmission path of the light. An inclination direction of the filter 3 is different from an inclination direction of the beam splitter 4. The filter 3 and the beam splitter 4 are approximately arranged in an inverted V-shaped manner.

In the embodiment, as shown in FIG. 2, the light reception assembly 21 includes a light receiving chip 8 and a trans-impedance amplifier 9 at a side of the light receiving chip 8. The trans-impedance amplifier 9 is fixed on the upper surface of the PCB substrate 1. The trans-impedance amplifier 9 amplifies a transmitted optical signal. The light receiving chip 8 receives the optical signal. Further, four walls of the groove 201 each are provided with a gap. The light reception assembly or an optical reflect device in the groove 201 can extend into the gap on the wall, thereby increasing the layout space. The trans-impedance amplifier 9 is provided at a left of the light receiving chip 8. An end of the trans-impedance amplifier 9 is inserted into the gap of the left wall. A light receiving path is as follows: Light returned by the connecting fiber 6 is transmitted to the fiber array 5, and transmitted to the filter 3 through the fiber array 5. The light is reflected by the filter 3 to the oblique plane 203 of the lens 2. After reflected by the lens 2, the light enters the light receiving chip 8.

Further, the light reception assembly 21 further includes an MPD 10. The MPD 10 is provided at a right of the light emission assembly 20. The MPD 10 is configured to receive light split by the beam splitter 4, thereby monitoring the light emitted from the light emission assembly 20.

In the embodiment, as shown in FIG. 2, the light emission assembly 20 includes a laser 11 and a light driver 12. The light driver 12 is provided at a right of the laser 11. The light driver 12 is connected to the laser 11. The laser 11 is configured to emit light to the beam splitter 4. The light driver 12 is provided between the laser 11 and the MPD 10. By reasonably arranging the laser 11, the light driver 12 and the MPD 10, after the light emitted from the laser 11 passes through the beam splitter 4, a part of the light is horizontally transmitted to the fiber array, and a part of the light passing through the beam splitter 4 is reflected by the lens 2 to the MPD 10. A light emitting path is as follows: The laser 11 emits light to the beam splitter 4. A part of the light is transmitted to the lens 2 through the beam splitter 4, and reflected by the lens 2 to the MPD 10. A part of the light is reflected by the beam splitter 4, horizontally transmitted to the fiber array 5, and transmitted to the optical connector 7 through the connecting fiber 6.

In the embodiment, in the same lens 2, an optical wavelength output by the filter 3 and an optical wavelength output by the laser 11 are the same, but different from a wavelength of the light receiving chip 8. In the lens 2, the optical wavelength output by the filter 3 and the optical wavelength output by the laser 11 are the same as a wavelength of the light receiving chip 8 in the other lens 2. In the embodiment, in one of the two lenses 2, the filter 3 has a wavelength of 855 nm, the light receiving chip 8 has a wavelength of 908 mm, and an optical wavelength output by the laser 11 is 855 nm. In the other one of the two lenses 2, the filter 3 has a wavelength of 908 nm, the light receiving chip 8 has a wavelength of 855 nm, and an optical wavelength output by the laser 11 is 908 nm.

In the embodiment, as shown in FIG. 1, a digital signal processor 13 is further provided on the PCB substrate 1. The digital signal processor 13 is provided at a side of the lens 2, and is specifically provided at a right of the lens 2. An end of the PCB substrate 1 opposite to the optical connector 7 is provided with a gold finger electrical connector 14. The digital signal processor 13 is close to an end of the gold finger electrical connector 14. An electronic element 15 is close to an end of the optical connector 7. The electronic element 15 includes a capacitor, a resistor, an inductor, etc.

A manufacturing process of the present disclosure is as follows.

The electronic element 15 is mounted on the upper surface of the PCB substrate 1. The electronic element 15 includes the capacitor, the inductor, the resistor, etc. The lasers 11 of two light emission assemblies 20 are mounted on the PCB substrate 1. The light receiving chips 8 of two light reception assemblies 21 are mounted on the PCB substrate 1. Two MPDs 10 are mounted on the PCB substrate 1. The light driver 12 and the trans-impedance amplifier 9 are mounted on the PCB substrate 1. The laser 11, the light receiving chip 8, the MPD 10, the light driver 12 and the trans-impedance amplifier 9 are bonded to the PCB substrate 1 by a wire. The lens 2 is preassembled. Specifically, the filter 3, the beam splitter 4 and the fiber array 5 are assembled in the lens 2. The preassembled lens 2 is coupled to the laser 11 and the light receiving chip 8. The lens 2 is mounted on the PCB substrate 1. The housing 16 is assembled. Through circulation of a high temperature and a low temperature, performance test of the optical module is performed.

The foregoing are merely descriptions of the preferred embodiments of the present disclosure. It should be noted that several improvements and replacements can be made by a person of ordinary skill in the art without departing from the technical principle of the present disclosure, and these improvements and replacements shall also be deemed as falling within the protection scope of the present disclosure.

The invention claimed is:

1. An 800G optical module with single-mode bidirectional fiber, comprising a housing and a printed circuit board (PCB) substrate in the housing, wherein two lenses are provided on the PCB substrate side by side along a width direction of the PCB substrate; a filter and a beam splitter are provided in each of the lenses; a groove with a downward rabbet is formed at a bottom of the lens; the groove of the lens is covered by one light emission assembly and one light reception assembly; both the light emission assembly and the light reception assembly are fixed on an upper surface of the PCB substrate; an end of the lens is connected to a fiber array; two fiber arrays are connected to one optical connector; and a connecting fiber between the fiber array and the optical connector is a single-mode bidirectional fiber; and light emitted from the light emission assembly is transmitted to the optical connector through the lens, the beam splitter, the filter, and the fiber array; and light received by the fiber array is transmitted to the light reception assembly through the filter and the lens;

wherein the light reception assembly comprises a light receiving chip and a trans-impedance amplifier at a side of the light receiving chip; and the trans-impedance amplifier is fixed on the upper surface of the PCB substrate.

2. The 800G optical module with single-mode bidirectional fiber according to claim 1, wherein an upper surface of the lens comprises a first horizontal plane, an oblique plane, and a second horizontal plane; a height of the first horizontal plane is less than a height of the second horizontal plane; the oblique plane is connected between the first horizontal plane and the second horizontal plane; the fiber array is connected to an end of the first horizontal plane; the oblique plane is provided above the light reception assembly; and an inclination angle of the oblique plane is 45° less than an inclination angle of the filter.

3. The 800G optical module with single-mode bidirectional fiber according to claim 1, wherein the filter is provided obliquely above the light reception assembly; the beam splitter is provided directly above the light emission assembly; and a reflecting surface of the beam splitter is formed into an included angle of 45° with the light emitted from the light emission assembly.

4. The 800G optical module with single-mode bidirectional fiber according to claim 1, wherein the light reception assembly further comprises a monitor photo detector (MPD); the MPD is provided at a side of the light emission assembly; and the MPD is configured to receive light split by the beam splitter.

5. The 800G optical module with single-mode bidirectional fiber according to claim 1, wherein four walls of the groove each are provided with a gap; and an end of the trans-impedance amplifier is inserted into the gap of one of the walls.

6. The 800G optical module with single-mode bidirectional fiber according to claim 1, wherein the light emission assembly comprises a laser and a light driver; the light driver is provided at a side of the laser; and the light driver is connected to the laser.

7. The 800G optical module with single-mode bidirectional fiber according to claim 6, wherein in one of the two lenses, the filter has a wavelength of 855 nm, the light receiving chip has a wavelength of 908 mm, and an optical wavelength output by the laser is 855 nm; and in the other one of the two lenses, the filter has a wavelength of 908 nm, the light receiving chip has a wavelength of 855 nm, and an optical wavelength output by the laser is 908 nm.

8. The 800G optical module with single-mode bidirectional fiber according to claim 1, wherein a digital signal processor is further provided on the PCB substrate; and the digital signal processor is provided at a side of the lens.

* * * * *